(12) United States Patent
Travis et al.

(10) Patent No.: US 9,181,877 B2
(45) Date of Patent: Nov. 10, 2015

(54) SEAL HOOK MOUNT STRUCTURE WITH OVERLAPPED COATING

(71) Applicant: United Technologies Corporation, Hartford, CT (US)

(72) Inventors: Brittany Travis, Middletown, CT (US); Fadi S. Maalouf, East Hampton, CT (US); Michael C. Firnhaber, Tolland, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 732 days.

(21) Appl. No.: 13/731,180

(22) Filed: Dec. 31, 2012

(65) Prior Publication Data
US 2014/0248130 A1    Sep. 4, 2014

Related U.S. Application Data

(60) Provisional application No. 61/706,245, filed on Sep. 27, 2012.

(51) Int. Cl.
| | |
|---|---|
| *F01D 11/08* | (2006.01) |
| *F02C 7/28* | (2006.01) |
| *F04D 29/52* | (2006.01) |
| *F04D 29/58* | (2006.01) |
| *F04D 29/64* | (2006.01) |

(52) U.S. Cl.
CPC . *F02C 7/28* (2013.01); *F01D 11/08* (2013.01); *F04D 29/526* (2013.01); *F04D 29/5853* (2013.01); *F04D 29/644* (2013.01); *F05D 2230/90* (2013.01)

(58) Field of Classification Search
None
See application file for complete search history.

(56) References Cited

U.S. PATENT DOCUMENTS

| 4,392,656 | A  | 7/1983  | Tirole et al. |
|---|---|---|---|
| 4,468,168 | A  | 8/1984  | Aubert |
| 5,993,150 | A  | 11/1999 | Liotta et al. |
| 6,224,337 | B1 | 5/2001  | Lieland et al. |
| 6,726,448 | B2 * | 4/2004 | McGrath et al. ........... 415/173.3 |
| 6,742,983 | B2 | 6/2004  | Schmuecker |
| 6,935,833 | B2 | 8/2005  | Seitz |
| 7,246,996 | B2 * | 7/2007 | Harris ........................... 415/177 |

(Continued)

OTHER PUBLICATIONS

International Search Report and Written Opinion for International Application No. PCT/US2013/061344 completed on Jan. 20, 2014.
International Preliminary Report on Patentability for International Application No. PCT/US2013/061344 mailed Apr. 9, 2015.

(Continued)

*Primary Examiner* — Christopher Verdier
*Assistant Examiner* — Justin Seabe
(74) *Attorney, Agent, or Firm* — Carlson, Gaskey & Olds, P.C.

(57) ABSTRACT

A seal is positioned radially outwardly of a compressor blade. The seal has a seal hook facing in a downstream direction. A seal mount has a mount hook for receiving the seal hook in a gap. The hook face in an upstream direction. The seal mount has an upstream portion extending from an upstream end into the gap. The mount hook extends into a web which extends in a downstream direction. A thermal barrier coating on the upstream portion of the seal mount extends to a downstream end. There is a thermal barrier coating on a radially inner surface of the mount hook, and along the web to a downstream coating end. An upstream end of the coating on the inner surface of the hook being formed axially upstream of the downstream end of the coating on the upstream portion.

12 Claims, 2 Drawing Sheets

(56) References Cited

U.S. PATENT DOCUMENTS

| | | |
|---|---|---|
| 7,597,533 B1 | 10/2009 | Liang |
| 7,859,100 B2 | 12/2010 | Torigoe et al. |
| 8,197,950 B2 | 6/2012 | Taylor et al. |
| 2004/0071548 A1 | 4/2004 | Wilson, Jr. |
| 2008/0124214 A1 | 5/2008 | Lutjen et al. |
| 2010/0215477 A1 | 8/2010 | Wilson |

* cited by examiner

SEAL HOOK MOUNT STRUCTURE WITH OVERLAPPED COATING

CROSS-REFERENCED TO RELATED APPLICATION

This application claims priority to U.S. Provisional Application No. 61/706,245, filed Sep. 27, 2012.

BACKGROUND OF THE INVENTION

This application relates to a seal mount for use in a gas turbine engine, wherein a hook portion has a thermal protective coating.

Gas turbine engines are known, and typically include a fan delivering air to a compressor. The compressor compresses air and delivers it into a combustion section. The air is mixed with fuel and ignited, and products of this combustion pass downstream over turbine rotors, driving them to rotate.

One effort in gas turbine engines is to maximize the efficiency. Thus, efforts are made to minimize leakage of gas flow throughout the engine. In one application, a seal is provided radially outwardly of compressor blades, to ensure that the air which is not compressed by the blades is minimized. Typically, these seals are mounted on a mount structure that includes a hook that provides a securing area for the seal. In the prior art, it is known for the hook on the mount structure to face downstream.

Recently, gas turbine engines have been provided with a gear reduction between a fan drive turbine and a fan. With the inclusion of this gear reduction, the fan may rotate at a distinct rate from a compressor which is also driven by a fan drive turbine. This has allowed larger diameter fans to be utilized. A fan for use in aircraft applications will typically deliver a portion of air into a bypass duct which then becomes propulsion for the aircraft, and a portion of air into a core where it delivered into the compressor to provide the flow described above for the gas turbine engine.

With increased diameter fans, a bypass ratio, or the ratio of air delivered into a bypass duct compared to the air delivered into the core engine has increased dramatically. With the increasing bypass ratio, it becomes critical to most efficiently utilize the air which is delivered into the core engine. Thus, various flow control features are being installed into gas turbine engines.

In at least one engine, a component provided to increase aerodynamic efficiency is positioned immediately upstream of the seal.

When this component is positioned in this location, a seal mount having a downstream facing hook cannot be utilized.

SUMMARY OF THE INVENTION

In a featured embodiment, a compressor section for use in a gas turbine engine has a compressor blade for rotating about an axis. A seal is positioned radially outwardly of the compressor blade. The seal has a seal hook facing in a downstream direction. A seal mount has a mount hook for receiving the seal hook in a gap. The mount hook faces in an upstream direction, with the seal mount having an upstream portion extending from an upstream end into the gap. The mount hook then extends into a web which extends in a downstream direction. A thermal barrier coating is on the upstream portion of the seal mount from an upstream end and extends to a downstream end. There is thermal barrier coating on a radially inner surface of the mount hook, and along the web with an upstream end of the coating on the radially inner surface of the hook that is formed axially upstream of the downstream end of the coating on the upstream portion.

In another embodiment according to the previous embodiment, at least a portion of the gap is not provided with thermal barrier coating.

In another embodiment according to any of the previous embodiments, a flow control feature is positioned upstream of the seal.

In another embodiment according to any of the previous embodiments, a second seal hook is positioned at a downstream end of the seal. The seal mount has a second mount hook with the second seal hook received in the mount hook.

In another embodiment according to any of the previous embodiments, the second mount hook also faces in an upstream direction.

In another featured embodiment, a gas turbine engine has a fan, a compressor section, a combustion section and a turbine section. The compressor section includes a compressor blade for rotating about an axis. A seal is positioned radially outwardly of the compressor blade. The seal has two seal hooks that both face in a downstream direction. A seal mount has a mount hook for receiving the seal hook in a gap. The mount hook faces in an upstream direction. The seal mount has an upstream portion extending from an upstream end into the gap, and then extends into a web which extends in a downstream direction. A thermal barrier coating is on the upstream portion of the seal mount from an upstream end extending to a downstream end. There is thermal barrier coating on a radially inner surface of the upstream one of the mount hooks, and along the web to a downstream coating end. An upstream end of the coating on the inner surface of the hook is formed axially upstream of the downstream end of the coating on the upstream portion.

In another embodiment according to the previous embodiment, at least a portion of the gap is not provided with thermal barrier coating.

In another embodiment according to any of the previous embodiments, a flow control feature is positioned upstream of the seal.

In another embodiment according to any of the previous embodiments, a second seal hook is positioned at a downstream end of the seal. The seal mount has a second mount hook, with the second seal hook received in the mount hook.

In another embodiment according to any of the previous embodiments, the second mount hook also faces in an upstream direction.

In another embodiment according to any of the previous embodiments, the turbine section includes a fan drive turbine for driving the fan. There is a gear reduction between the fan drive turbine and the fan.

In another embodiment according to any of the previous embodiments, the gear reduction has a ratio of greater than about 2.3.

In another embodiment according to any of the previous embodiments, the fan delivers air into a bypass duct, and into the compressor section.

In another embodiment according to any of the previous embodiments, a bypass ratio may be defined as the volume of air delivered into the bypass duct compared to the volume of air delivered into the compressor section. The bypass ratio is greater than about 6.

In another embodiment according to any of the previous embodiments, the bypass ratio is greater than about 10.

DETAILED DESCRIPTION

Figure 1:
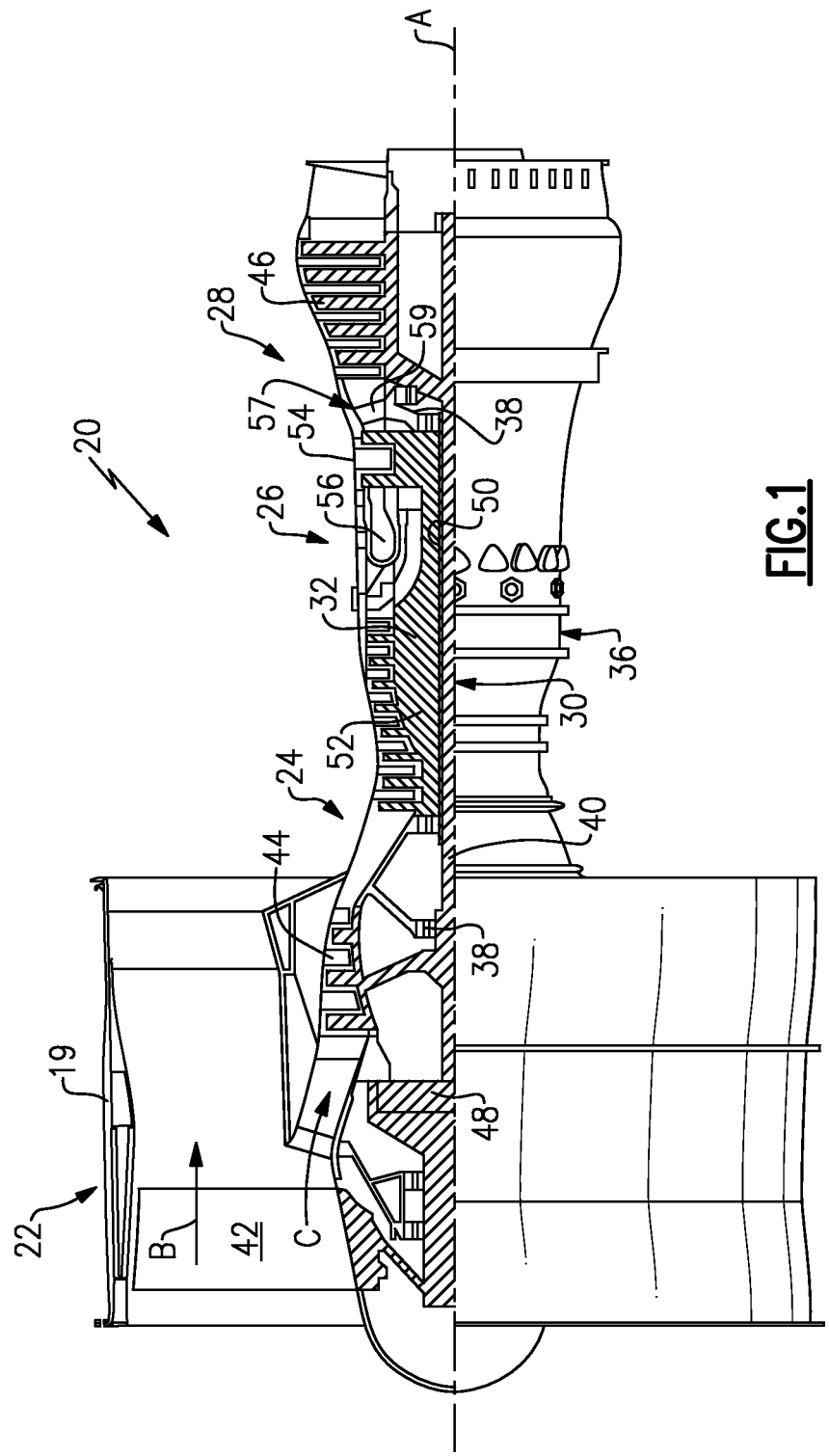
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B within a bypass duct inside a nacelle 19. A compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. That is, architecture 48 is a gear reduction. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7\ °R)]^{0.5}$. The "Low corrected fan tip speed" as disclosed herein according to one non-limiting embodiment is less than about 1150 ft/second.

Figure 2:
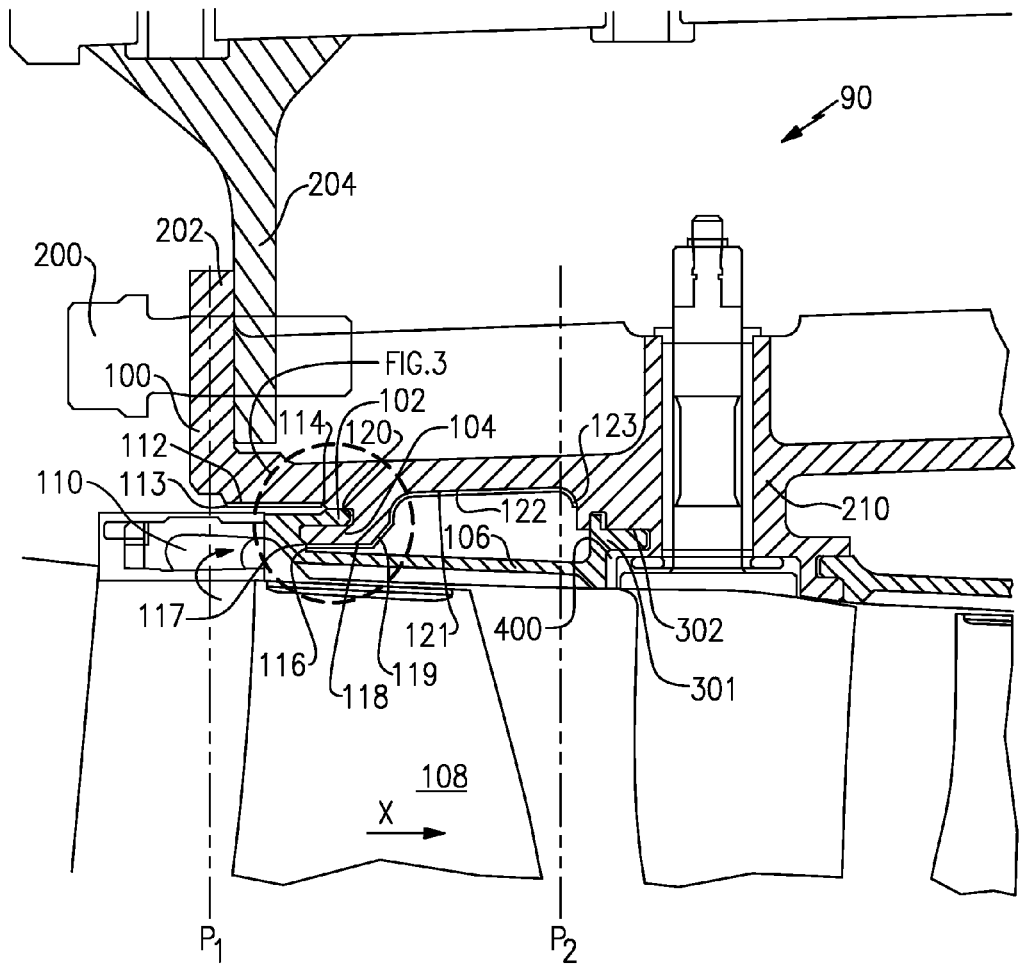
FIG. 2 is a detailed drawing of a portion of a compressor.

FIG. 2 shows a portion 90 of the high pressure compressor 52. A mount member 100 has a radially outwardly extending leg 202 which receives a bolt 200 to mount the mount member 100 to a housing 204. An opposed side 210 of the mount member 100 is also secured to the housing 204. A central web 122 extends across the mount member 100 to a first mount hook 104. The first hook 104 has a gap 120. Airflow in this Figure would be from left to right, and along the direction labeled X. As such, the first hook 104 faces in an upstream direction. Another gap 302 is formed in a second mount hook 400 at a downstream area of the mount member 100. A first seal hook 102 from a blade outer air seal 106 and a second seal hook 301, are received in gaps 120 and 302, respectively. The hooks 102 and 301 face in the downstream direction.

The seal 106 is typically positioned radially outwardly of a compressor blade 108, and the seal may be as known.

A flow control feature 110 is positioned immediately upstream of the seal 106. A flow control feature 110 guides reverse air which has been undesirably forced in an upstream direction by a compressor blade 108. The feature 110 is positioned immediately upstream of the seal 106. The inclusion of the feature 110 requires that the ear 104 face upstream for packaging reasons.

An inner surface of the mount member 100 has an upstream portion 112 leading into the gap 120. The hook 104 extends around, and radially outwardly at location 119, before merging into the web 122, and then to the gap 302.

Figure 3:
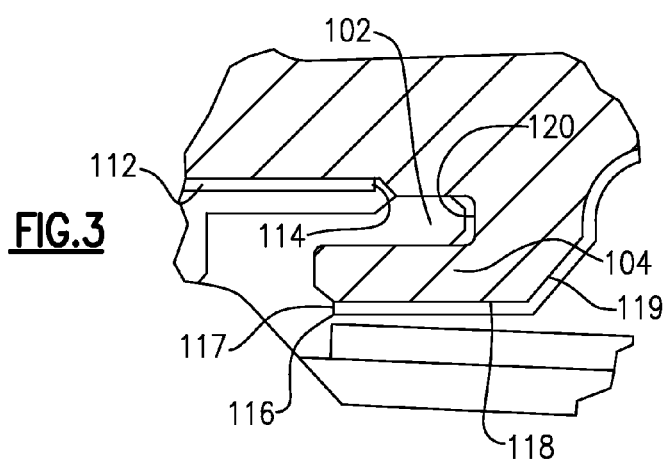
FIG. 3 is a detail of the area in circle 3 of FIG. 2.

A thermal barrier coating portion on the portion 112 has an upstream end 113, and moves downstream to a downstream end 114. The thermal barrier coating is not provided within at least a portion of the gap 120. Another thermal barrier coating portion 116 is positioned at a radially inwardly facing surface 118 of the hook 104, and along a radially outwardly bending portion 119. Thermal barrier coating 121 is positioned along the web 122, and extending to a downstream end 123. Notably, an upstream end 117 of the coating portion 116 is upstream of the downstream end 114 of the coating portion 112. This is best shown in FIG. 3. Thus, the coating portions 112 and 116 have axial overlap. It is desirable that the thermal barrier coating be provided along an entire distance between points $P_1$ and $P_2$. Generally the points $P_1$ and $P_2$ correspond to an axial dimension which is at least equal to an axial extent of the blade 108.

With the disclosed arrangement, and due to the axial overlap, the upstream facing hook 104 can still be utilized, but there will still be thermal barrier coating provided over the desired axial extent, without requiring complex coating techniques.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A compressor section for use in a gas turbine engine, comprising:
 a compressor blade for rotating about an axis;
 a seal positioned radially outwardly of said compressor blade, and said seal having a seal hook facing in a downstream direction;
 a seal mount, said seal mount having a mount hook for receiving said seal hook in a gap, and said mount hook facing in an upstream direction, with said seal mount having an upstream portion extending from an upstream end into said gap, said mount hook then extending into a web which extends in a downstream direction; and
 a thermal barrier coating on said upstream portion of said seal mount from an upstream end and extending to a downstream end, and there being thermal barrier coating on a radially inner surface of said mount hook, and along said web with an upstream end of said coating on said radially inner surface of said hook being formed axially upstream of said downstream end of said coating on said upstream portion.

2. The compressor section as set forth in claim 1, wherein at least a portion of said gap is not provided with thermal barrier coating.

3. The compressor section as set forth in claim 1, wherein a flow control feature is positioned upstream of said seal.

4. The compressor section as set forth in claim 1, wherein a second seal hook is positioned at a downstream end of said seal, and said seal mount having a second mount hook, with said second seal hook received in said mount hook.

5. The compressor section as set forth in claim 4, wherein said second mount hook also faces in an upstream direction.

6. A gas turbine engine comprising:
 a fan, a compressor section, a combustion section and a turbine section;
 said compressor section including a compressor blade for rotating about an axis;
 a seal positioned radially outwardly of said compressor blade, and said seal having two seal hooks, said seal hooks both facing in a downstream direction;
 a seal mount, said seal mount having a mount hook for receiving said seal hook in a gap, and said mount hook facing in an upstream direction, with said seal mount having an upstream portion extending from an upstream end into said gap, said mount hook then extending into a web which extends in a downstream direction; and
 a thermal barrier coating on said upstream portion of said seal mount from an upstream end extending to a downstream end, and there being thermal barrier coating on a radially inner surface of said upstream one of said mount hooks, and along said web to a downstream coating end, with an upstream end of said coating on said inner surface of said hook being formed axially upstream of said downstream end of said coating on said upstream portion.

7. The gas turbine engine as set forth in claim 6, wherein at least a portion of said gap is not provided with thermal barrier coating.

8. The gas turbine engine as set forth in claim 6, wherein a flow control feature is positioned upstream of said seal.

9. The gas turbine engine as set forth in claim 6, wherein a second seal hook is positioned at a downstream end of said seal, and said seal mount having a second mount hook, with said second seal hook received in said mount hook.

10. The gas turbine engine as set forth in claim 9, wherein said second mount hook also faces in an upstream direction.

11. The gas turbine engine as set forth in claim 6, wherein said turbine section includes a fan drive turbine for driving said fan, and there being a gear reduction between said fan drive turbine and said fan.

12. The gas turbine engine as set forth in claim 11, wherein said fan delivering air into a bypass duct, and into said compressor section.

* * * * *